No. 704,796. Patented July 15, 1902.
H. S. HALLWOOD.
CASH REGISTER.
(Application filed Jan. 3, 1899.)

(No Model.) 9 Sheets—Sheet 1.

Witnesses
J. H. Frarel
H. B. Bradshaw

Inventor
Henry S. Hallwood
By his Attorney
C. C. Shepherd

No. 704,796. Patented July 15, 1902.
H. S. HALLWOOD.
CASH REGISTER.
(Application filed Jan. 3, 1899.)
(No Model.) 9 Sheets—Sheet 2.

Fig. 2

Witnesses
J. H. Frarch
H. B. Bradshaw

Inventor
Henry S. Hallwood
By his Attorney
C. C. Shepherd

No. 704,796. Patented July 15, 1902.
H. S. HALLWOOD.
CASH REGISTER.
(Application filed Jan. 3, 1899.)

(No Model.) 9 Sheets—Sheet 3.

Fig. 3

Witnesses  Inventor
J. H. Fravel  Henry S. Hallwood
H. B. Bradshaw  By his Attorney
  C. C. Shepherd No. 704,796. Patented July 15, 1902.
H. S. HALLWOOD.
CASH REGISTER.
(Application filed Jan. 3, 1899.)
(No Model.) 9 Sheets—Sheet 4.

Fig. 4

Witnesses
Inventor
Henry S. Hallwood
By his Attorney

No. 704,796.  
H. S. HALLWOOD.  
CASH REGISTER.  
(Application filed Jan. 3, 1899.)  
(No Model.)  
Patented July 15, 1902.  
9 Sheets—Sheet 8.

No. 704,796. Patented July 15, 1902.
H. S. HALLWOOD.
CASH REGISTER.
(Application filed Jan. 3, 1899.)
(No Model.) 9 Sheets—Sheet 9.

UNITED STATES PATENT OFFICE.

HENRY S. HALLWOOD, OF COLUMBUS, OHIO, ASSIGNOR, BY MESNE ASSIGNMENTS, TO THE HALLWOOD CASH REGISTER COMPANY, OF COLUMBUS, OHIO, A CORPORATION OF OHIO.

CASH-REGISTER.

SPECIFICATION forming part of Letters Patent No. 704,793, dated July 15, 1902.

Application filed January 3, 1899. Serial No. 700,908. (No model.)

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a specification.

My invention relates to the improvement of cash registers and indicators of that class wherein a recording and indicating mechanism is employed in conjunction with one or more sets or series of value-keys, the depression of which controls the degree of operation of said registering and indicating mechanism.

The objects of my invention are to provide a cash-register of this class of an improved construction and arrangement of parts; to provide improved means for locking the keys in depressed positions until the operation of the registering mechanism and improved means for returning said keys to their outer positions at the close of the registering operation; to provide an improved construction and means of operation of the amount indicators or targets; to so construct and arrange the drawer-operating mechanism as to cause said drawer to open toward the rear of the machine; to so construct and arrange the parts of said machine as to facilitate its use by a cashier located in rear thereof and to provide means whereby the amount registered will be indicated from both the front and rear of the machine; to provide improvements in the mechanism for transferring amounts from one registering-wheel to the other, and to produce other improvements the details of construction and arrangement of which will be more fully pointed out hereinafter. These objects I accomplish in the manner illustrated in the accompanying drawings, in which—

Similar characters refer to similar parts throughout the several views.

In the construction of my improved cash-register I employ a suitable base-frame 1, the latter being provided with a horizontal top plate 2. Upon this base top plate is supported the register-body, to be hereinafter described, and within the base-frame a sliding cash-drawer, which is indicated at 3. This cash-drawer, which is adapted to open rearwardly, has its projecting side strips 4 (shown more clearly in Fig. 10) bearing and traveling upon wheels 5, (indicated in Fig. 2,) which are journaled in the sides of the frame 1. The sliding cash-drawer has a further bearing on a central guide-rod 6, which extends between the front and rear portions of the base-frame 1, this bearing being attained through the medium of a grooved guide-wheel 7, which is journaled in a bracket extending from the rear portion of the drawer, said guide-wheel bearing upon said rod. As shown more clearly in Fig. 10, the base-frame is provided in its front portion with an upwardly-projecting lug 8, from which projects rearwardly a coiled spring 9, the outer end of the latter being adapted to come into contact with a plate 10 on the inner side of said cash-drawer, said plate being provided with a central conical projection 10$^a$, adapted to be embraced by the outer end of said spring when the drawer is in a closed or nearly-closed position. It is evident that the spring thus provided is intended to assist the drawer in its outward movement when the same is opened.

Figure 10:
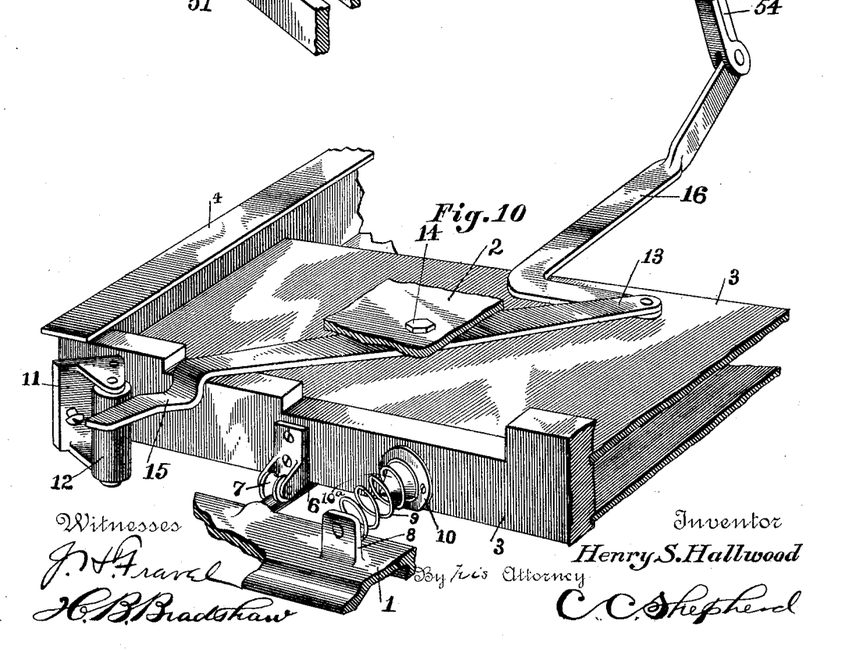
Fig. 10 is a view in perspective of the rear portion of the cash-drawer, showing the arrangement of levers whereby a rearward opening movement is attained.

On the inner end of the drawer 3 and adjacent to one side thereof I provide a projecting bracket 11, the latter standing, as shown, at an angle with the drawer end and having journaled therein a vertical friction-roller 12. 13 represents a lever-bar which has its central portion fulcrumed at 14 to the under side of the base-frame top plate 2. This lever-bar has one of its end portions, as indicated at 15, extending over the inner end of the drawer and in contact with the periphery of the roller 12, while the remaining end of said lever-bar has a jointed connection with one arm of an angular lever 16, the outer portion of the remaining arm of which is inclined upwardly, as indicated in Fig. 10.

As set forth in my former application for patent, Serial No. 669,359, filed February 7, 1898, I provide the drawer with an upwardly-projecting bracket or standard 17, from which depends in the plane of a rack-bar 19 on the base-frame a pivoted dog 18. This dog being so supported as to depend normally below the plane of the rack-teeth it is obvious that it will be inclined by contact with the end of said rack in the opposite direction from that in which the drawer may be moved and in such inclined position said dog will by engagement with the rack-teeth prevent a reversed motion of the drawer until the dog has passed entirely over the rack, said dog thus serving to insure the opening of the drawer to a predetermined distance before the same can be closed and to insure the complete closing of the drawer before the same can again be opened.

Rising from the base top plate are suitably-formed end frames 20, the latter being connected at desirable intervals by transverse frame-rods to form a supporting-frame cage for the mechanism to be described. Extending centrally between the end frames 20 is a fixed transverse extending rod or shaft 21, and between said end frames and in front of said rod or shaft I support, preferably on one side of the center of the width of the machine, a key-bearing frame 22, the latter consisting of an external or face plate 23, which is preferably curved in the arc of a circle shown and which has formed therewith at intervals on its inner side inwardly-projecting wings or ribs 24, the inner curved edge of each of the latter being provided with a laterally-projecting rib or shoulder 25.

Figure 1:
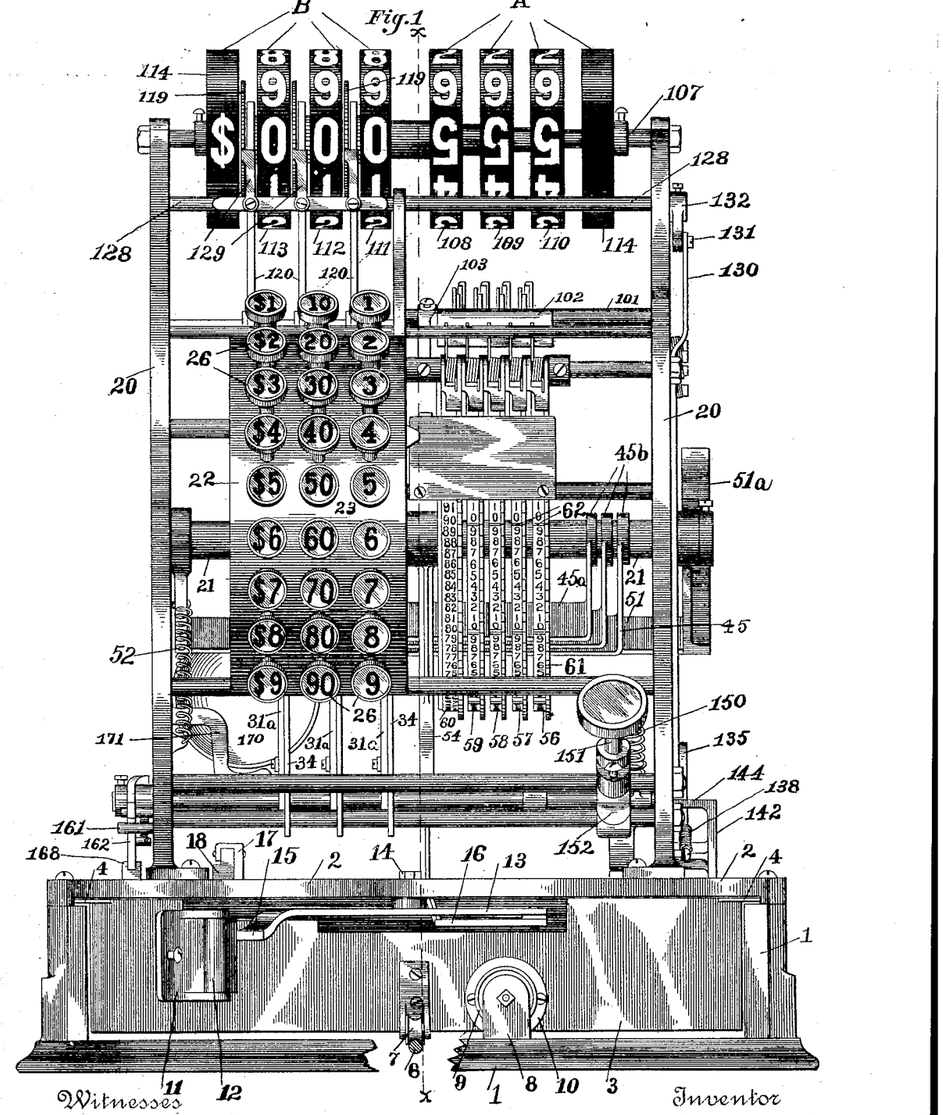
Figure 1 is a front elevation of my improved machine, showing the same without a case or cover.
Figure 2:
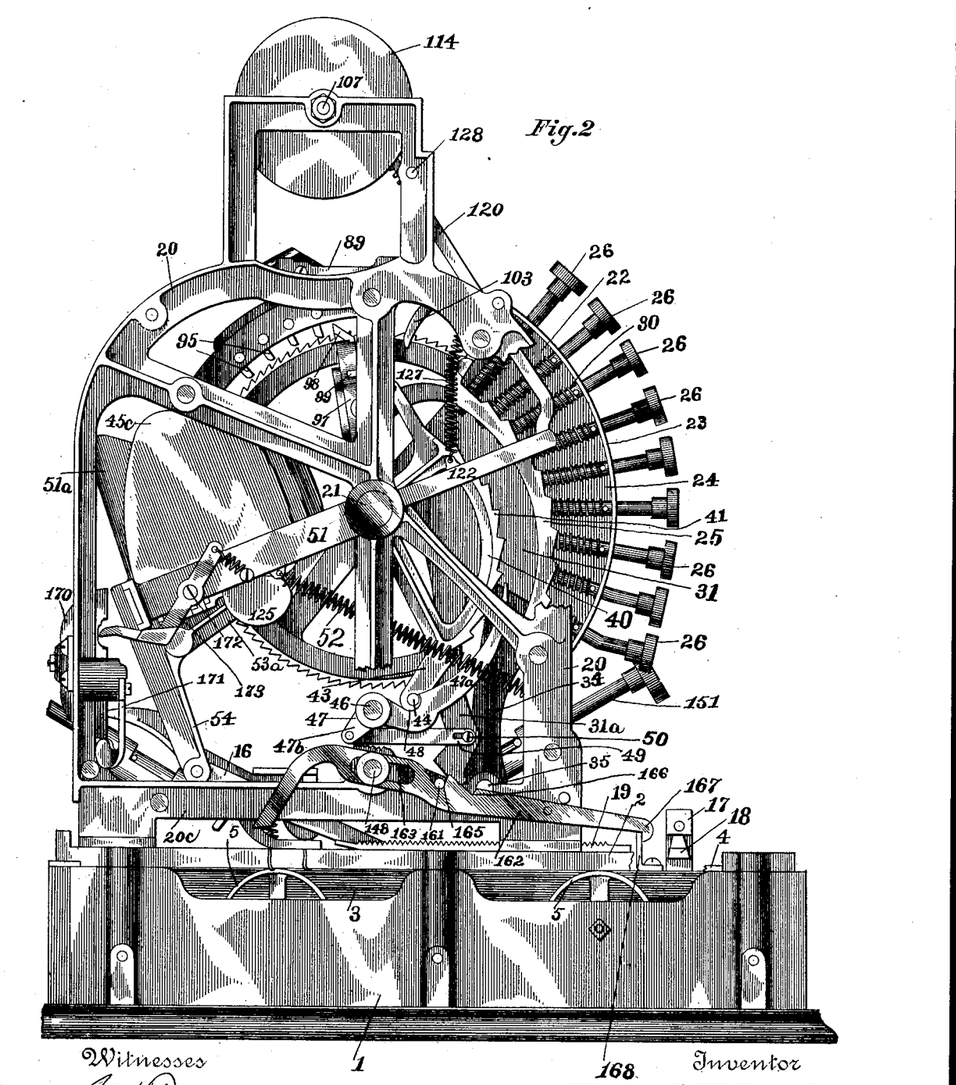
Fig. 2 is a side elevation of the same, showing the parts in their normal positions.

26 represents the value-keys, of which there may be any desired number of sets or series, the keys forming each set being radially supported, as shown, their stems passing through openings in the curved face-plate 23 and the inner ends of said stems entering openings formed through the shoulders 25 of the wings or plates 24, which separate the sets of value-keys. As indicated in Fig. 1 of the drawings, the usual button terminations of the keys are numbered or provided with figures representing amounts or money values, there being in the drawings three sets or series of these keys shown, the set to the extreme left indicating dollars, the set adjoining indicating amounts in dimes from ten to ninety cents, and the set to the right indicating amounts in pennies from one to nine. As shown more clearly in Fig. 5 of the drawings, each of the key-stems is provided with a laterally-projecting pin 28, said pins extending through radially-arranged slots 29 in the adjoining plates or wings 24. The outward movement of each key is limited by the contact of its pin 28 with the outer end of its slot 29, said keys being normally held in this position by springs 30, which, as shown in Fig. 2, surround the stems between the plate 23 and shoulders 25.

Mounted loosely on the shaft 21 are key lock-plates 31. Each of these lock-plates, which is substantially of a battle-ax form, has the curved outer edge of its blade or head provided at intervals with hook-fingers 32, and one of said lock-plates is provided for each set of keys. In the upper portion of each of the lock-plates is a laterally-projecting pin 33.

34 represents latch-plates, one of the latter being arranged, as shown, adjacent to each of the lock-plates and said latch-plates having their lower end portions fulcrumed on a transverse frame-rod 35 in the lower portion of the machine. The curved outer edges of the latch-plates are thus supported slightly in rear of the outwardly projecting and beveled ends of the lock-plate hook-fingers. Each of the latch-plates has its upper end connected with a forward cross-rod through the medium of a comparatively short spring 37 and in its upper portion and forward side is provided with a recess 36, which is formed, as indicated, respectively, at 38 and 39, with an upper and lower rear and forward offset or pin-seat. In the upper and rear seat or offset 38 normally rests the pin 33 of the adjoining lock-plate, the engagement of said pins and offsets serving to normally retain the hook-fingers of the lock-plate out of the paths of the laterally-projecting key-stem pins 28.

Figure 4:
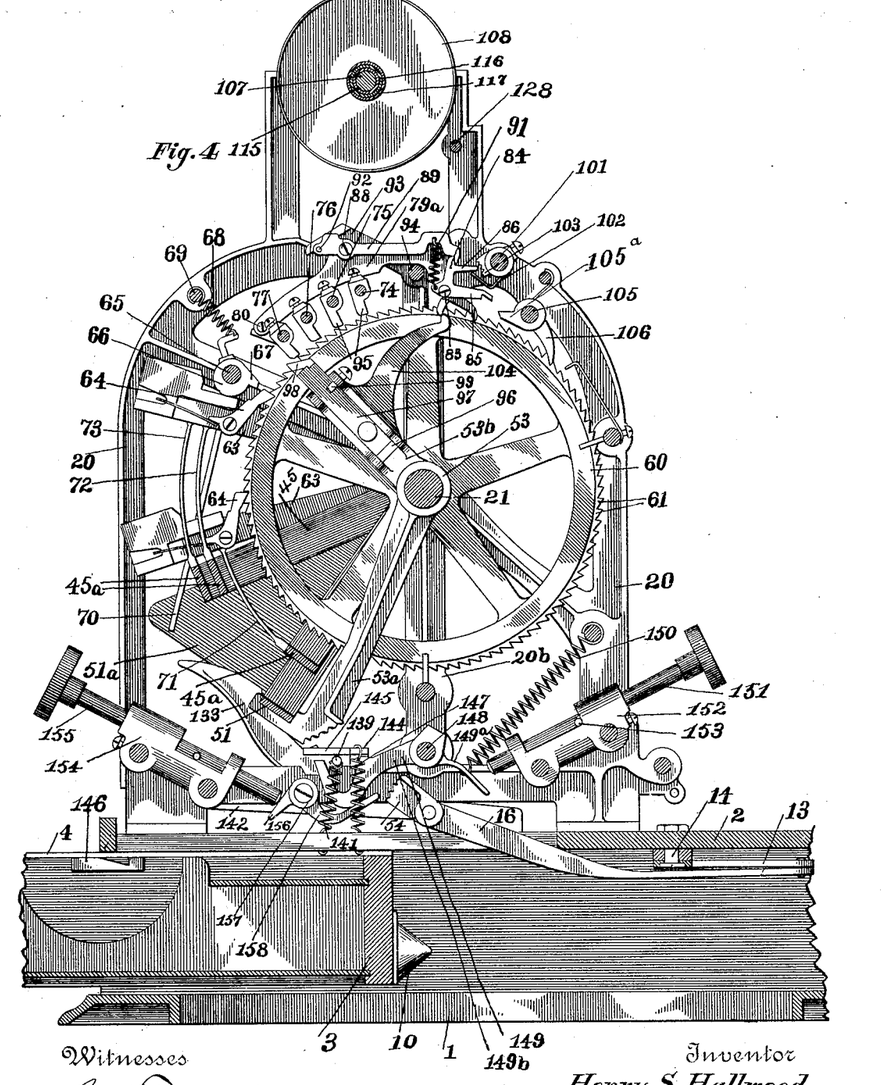
Fig. 4 is a view similar to Fig. 3, showing the position of the parts after the depression of a value-key and the opening of the drawer.

Mounted to swing on the shaft 21, opposite each of the key-sets, is a frame-segment 40, the rim of the latter being in the arc of a circle which is eccentric to the shaft 21, said rim being provided with successively-arranged notches or stop-shoulders 41. (See Fig. 2 of the drawings.) The lower end of each of the segments 40 is provided with an extension 43, from which projects laterally a pin 44. Each of the segments 40 on the rear side of its fulcrum-point is provided with a rearwardly-extending arm of a yoke-shaped frame 45, the rear bar 45$^a$ of which extends across the rear portion of the machine, said yoke side arms being of such different lengths as to prevent conflict of said rear bars, this construction being shown more clearly in Figs. 1, 4, and 5. Each of the yokes 45 is provided with an upper side weight 45$^c$. The remaining end or side arm of each of the yokes is fulcrumed adjacent to the right-hand side of the machine on the central rod 21, as indicated at 45$^b$.

Upon a horizontal shaft 46, which extends between the end frames and beneath the shaft 21, I fulcrum segment locking-levers 47, one for each set of keys, each of said levers being substantially in the form of a bell-crank. (See Figs. 2 and 8.) The forward and longer arm 47$^a$ of each of these levers is curved upward and is provided in its upper side near its rear portion with a rounding notch or recess 48, into which normally projects the pin 44 of the adjoining segment extension 43. The remaining arm 47$^b$ of each of the levers 47 is connected with the downward extension 31$^a$ of the corresponding lock-plate 31 through the medium of a connecting-bar 49, the latter having its forward end slotted and said slot engaging a projecting pin 50 on said lock-plate extension 31$^a$. This slot-and-pin connection serves as a substitute for a positive lock against the depression of the keys while the drawer stands open. When the drawer is opened, the weight of those yokes 45 which have not been released by the depression of a key in its corresponding bank is sustained by the pin 44 on the segment extension 43, which engages with the notch 48 in the arm 47$^a$. This notch is of such a shape that when the weight of the yoke is thus thrown against its forward face it will remain up in engagement with the pin 44. If, however, there were no loose connection between the lock-plate extension and the connecting-bar 49, the depression of a key while the drawer was open would force the arm 47$^a$ downwardly and release the corresponding yoke. This would result in a different indication and registration from that originally given and would be effected without sounding the alarm. By the slot-and-pin connection, however, the keys may be depressed after the drawer is opened without releasing any of the yokes which were not released when the keys representing the sale were depressed.

Loosely embracing the outer one of the yokes 45 I provide a weighted yoke 51, of which 51$^a$ represents the weight, which is arranged at one side thereof. (See Fig. 9.) This outer yoke has its side arms fulcrumed on the shaft 21, one of said yoke side arms being connected, through the medium of a spring 52, with the forward portion of the framework, said spring exerting a downward and forward pull on said yoke.

Figure 3:
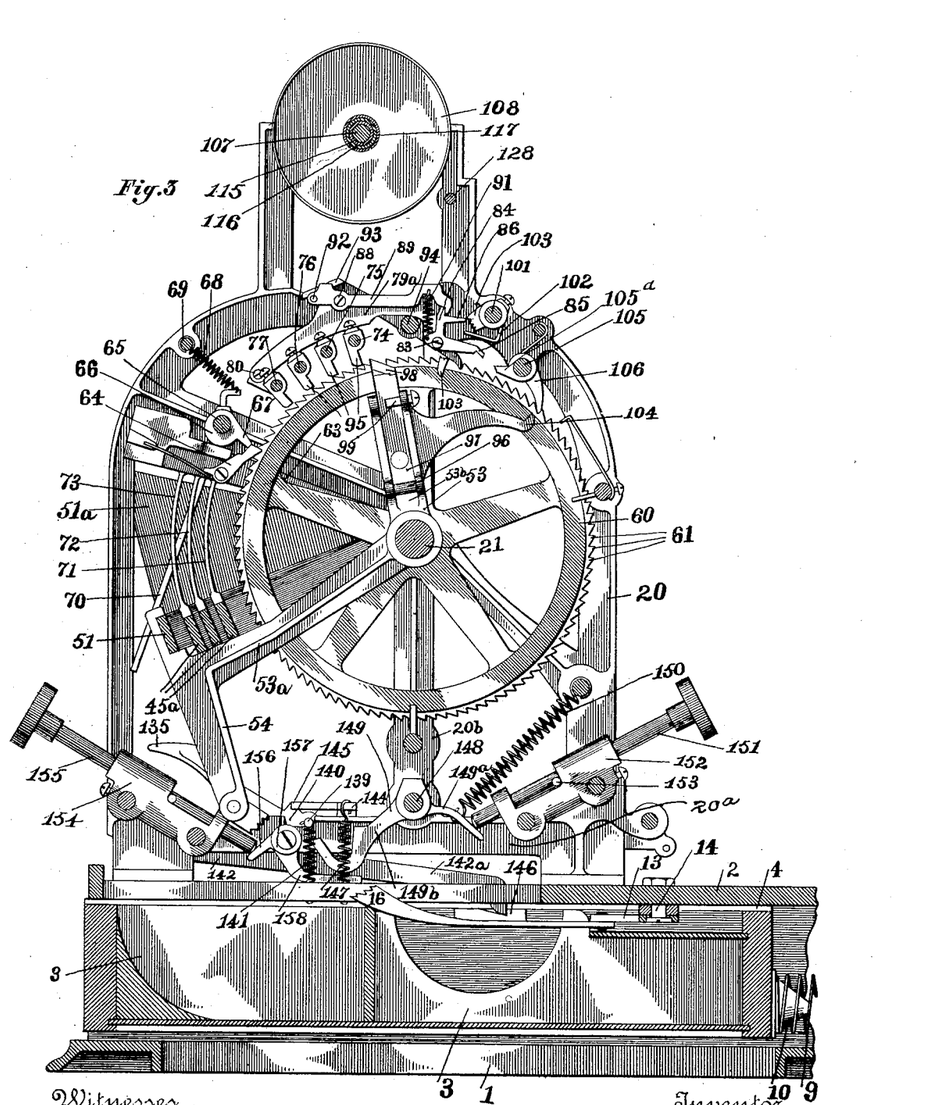
Fig. 3 is a vertical section taken on line $x\ x$ of Fig. 1.

As indicated more clearly in Fig. 3 of the drawings, I fulcrum on the central portion of the shaft 21 an angular lever 53, the rearwardly-extending and downwardly-inclined arm 53$^a$ of which is provided with a downward extension 54, the upper portion of which is connected with the central portion of the rear bar of the yoke 51. As indicated both in Fig. 3 and Fig. 10 of the drawings, the lower end of the arm 54 has a fulcrum connection with the outer end of the lever 16.

Upon the main shaft 21 is loosely mounted within the inner yoke 45 a set of registering-wheels, the latter being indicated, respectively, at 56, 57, 58, 59, and 60. These registering-wheels in the order above mentioned may be denoted as units, tens, hundreds, tens-of-hundreds, and thousands wheels, inasmuch as the wheel 56 is intended to register cents from one to ten, the wheel 57 to register dimes from one to ten, and the wheels 58, 59, and 60 to register dollars. In constructing these wheels they are each provided on one side with projecting teeth 61, of which there are one hundred for each wheel. The peripheries of each of the four first amount wheels are divided through the medium of peripheral lugs or projections 62 into ten equal spaces, each space being numbered as indicated, successively from "0" to "9," inclusive, and one of said numbers or figures being arranged opposite each tooth 61. The last wheel 60 has its peripheral numerals running from "0" to "99," inclusive.

63 represents pawl-carrying arms the inner ends of which are journaled on the shaft 21 and the rearwardly-extending portion of each of which carries a spring-actuated pawl 64. The number of pawl-carrying arms corresponds with the number of yokes 45, and the pawls 64 of said arms engage, respectively, with the teeth of the units, tens, and hundreds registering-wheels.

Figure 9:
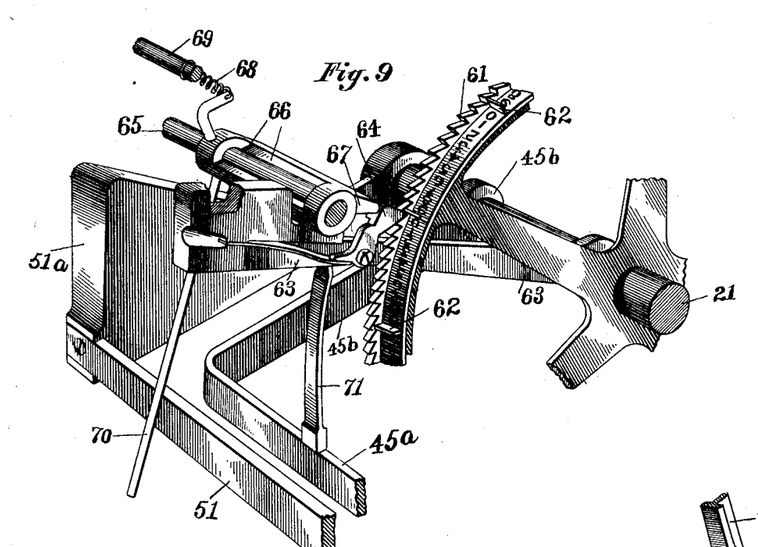
Fig. 9 is a detail view in perspective, illustrating the operation of one of the registering-wheels and the means for directly operating the same and adjoining parts.

As indicated more clearly in Fig. 9 of the drawings, I mount loosely upon a transverse rod 65, which is immediately above the inner portion of the pawl-carrying arms, a latch 66, which has formed longitudinally on its inner side a projecting tongue 67. The latch-body 66 is, through the medium of a spring 68, connected with a frame-rod 69 of the machine, the tendency of said spring being to hold the projecting latch-tongue 67 above and out of engagement with the rear side of the pawls 64. The latch is, however, provided with a downwardly-extending and rearwardly-inclined rod 70, the lower portion of which is normally engaged and rearwardly pressed by the contact therewith of the rear bar of the outer yoke 51. This outward pressure on the rod 70 results in the latch-tongue 67 being held in the position indicated in Fig. 9—that is, in engagement with or adjacent to the rear surface of the pawls 64. Each of the pawl-carrying arms is elevated from and supported by one of the yokes 45 through the medium of fingers 71, 72, and 73, which depend from said pawl-carrying arms and bear, respectively, upon the rear bars of said yokes 45ᵃ.

I shall now proceed to describe the construction and arrangement of that portion of the machine which is termed the "transferring mechanism," or means by which one amount is transferred from one registering-wheel to another.

Suitably journaled in the framework of the machine above the registering-wheels and arranged in the arc of a circle parallel with the arcs described by said registering-wheels are transverse shafts or rods (see Fig. 7) 74, 75, 76, and 77. On each of these shafts or rods is secured a bracket or block 78, (see Fig. 14,) these brackets being arranged out of alinement with each other, one above each of the first four registering-wheels.

Figures 11, 12, 13, 14:
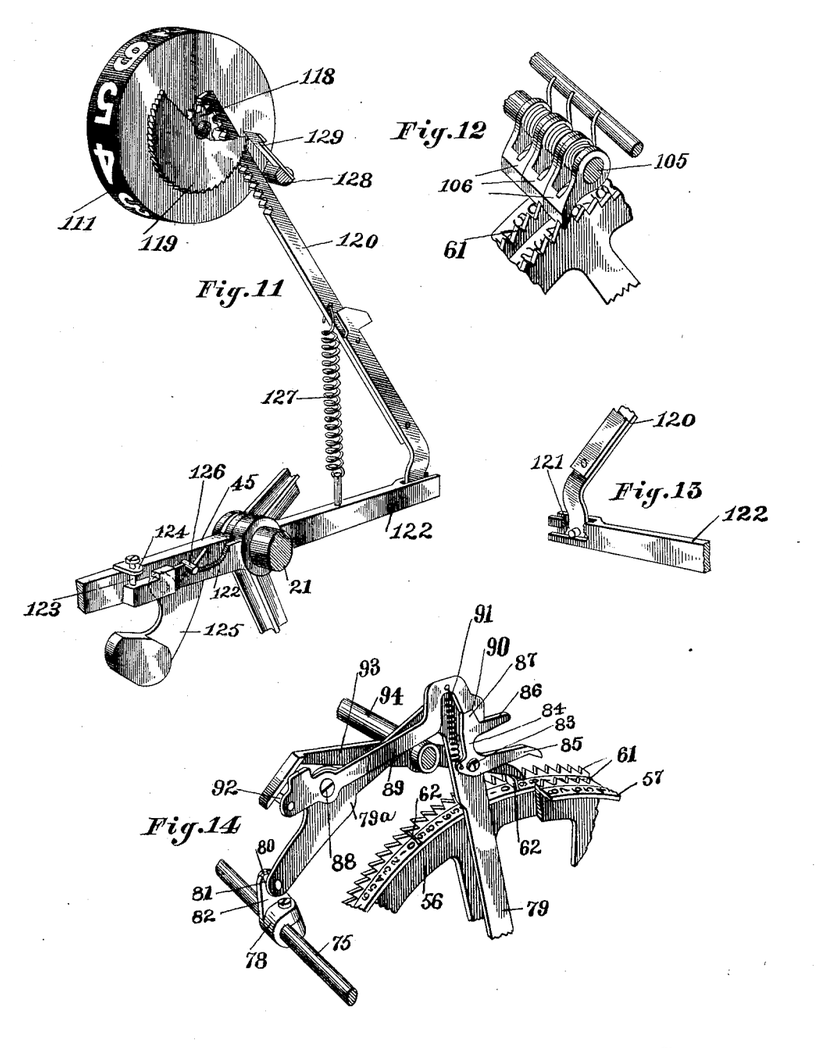
Fig. 11 is a perspective view of one of the targets or indicating-wheels, showing in connection therewith one of the target-operating bars and its connections.
Fig. 12 is a detail view in perspective of portions of two registering-wheels, showing the spring-actuated pawls in connection therewith for preventing the reversed movement of said wheels.
Fig. 13 is a detail view in perspective illustrating the connection of a target or indicating-wheel operating bar with the fulcrumed lever which imparts motion to said bar.
Fig. 14 is a detail view in perspective of the mechanism which I employ for transferring or carrying over amounts from one registering-wheel to another.
Figure 15:
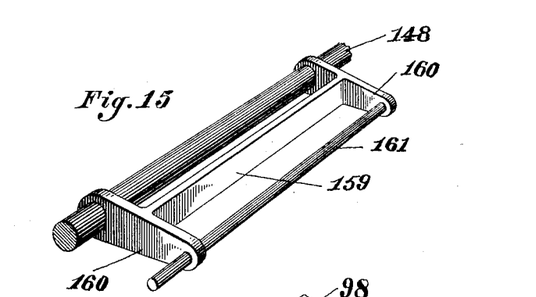
Fig. 15 is a perspective view of the lock-plate-resetting frame.

79 represents angular bars the lower end of the substantially vertical arm of which is fulcrumed on the shaft 21, one of said lever-arms being thus fulcrumed between each pair of the registering-wheels. The rearwardly-extending arm 79ᵃ of each of these angular bars 79 has its end portion provided with a laterally-projecting pin 80, which loosely engages a notch or recess 81 in a projecting lug 82 of one of the brackets 78. To the upper portion of the vertical arm of each of the bars 79 is fulcrumed, as indicated at 83, the lower portion of a catch-lever 84, the latter being provided opposite its fulcrum-point with a forwardly-projecting pawl-arm 85, having a downturned end portion and being provided in its upper portion with a short forwardly-projecting arm 86 at a point below the angular head 87 of said catch-lever body. To each of the rearwardly-extending arms 79ᵃ is pivoted, as indicated at 88, a forwardly-extending hook-bar 89, the hook-shaped forward end of which is provided on its inner side with an angular recess 90, which is adapted to engage the correspondingly-shaped top and forward face of the catch-lever head 87. The above-described engagement of the hook-bar and catch-lever head is normally retained through the medium of a coiled spring 91, which connects said hook and the lower portion of the catch-lever body. It will be observed that the engagement described also serves to hold the pawl-arm 85 out of the path of the teeth of the adjoining registering-wheel.

Figure 17:
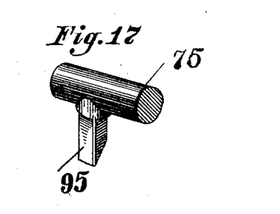
Fig. 17 is a similar view of one of the transfer-operating triggers.

In rear of its pivot-point the hook-bar 89 is provided with a laterally-projecting pin 92, with the upper side of which contacts the rearwardly-inclined end portion of a pawl-bar 93, the latter being fulcrumed centrally upon a transverse frame-rod 94. In Fig. 14 of the drawings I have shown portions of two adjoining registering-wheels, which I will refer to as the "units" and "tens" wheels. While the pawl-arm 85, heretofore described, is normally supported above the teeth of the tens-wheel 57, it will be observed that the pawl-arm 93 has its forward and inclined portion retained in the path of the projecting lug 62 of the adjoining units-wheel 56. Each of the rods numbered from 74 to 77 has secured to its inner end portion a short depending trigger, the latter being numbered 95. The inner sides of these triggers are, as indicated in Fig. 17, beveled.

Figures 7, 8:
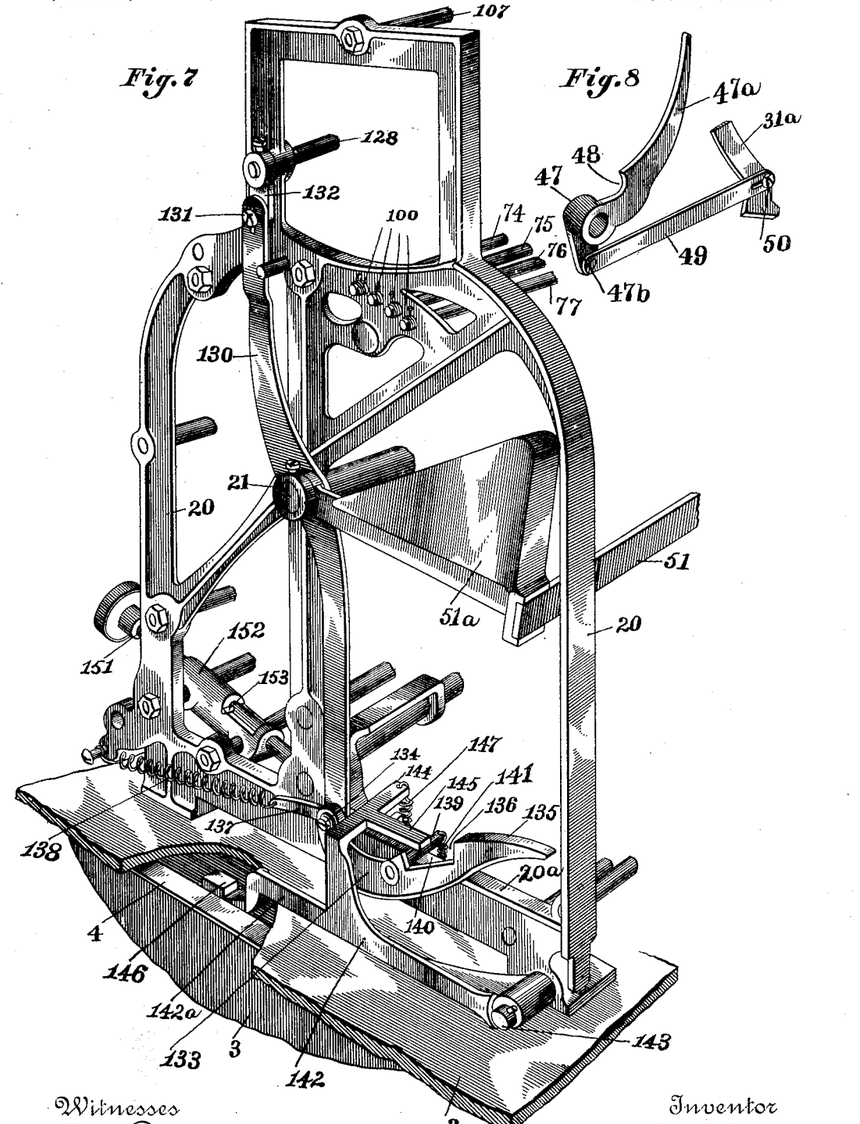
Fig. 7 is a view in perspective of one end of the machine.
Fig. 8 is a detail view in perspective of a segment locking-lever which I employ in the manner hereinafter described.

In order to normally retain the upper arm 79ᵃ of the lever-bar 79 and hook-bar 89 in a rearward position, I have employed a coiled spring for the outer end of each of the rods numbered from 74 to 77, these springs being indicated more clearly in Fig. 7 of the drawings, where they are numbered 100, one end of each of said springs being connected with the stationary framework and the remaining end portion thereof being connected with and coiled about the end of one of said rods, the tendency of said springs being to turn said rods rearwardly.

Figure 16:
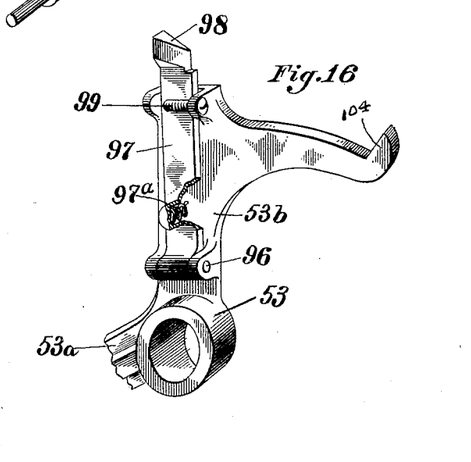
Fig. 16 is a detail view in perspective of a spring-actuated trip-lever.

The upper arm 53ᵇ of the lever 53 is provided with upper and lower face-lugs, and between the lower pair of these lugs is hinged at 96 a trip-bar 97, the latter having its upwardly-extending end portion beveled and inclined, as indicated at 98. The trip-bar is, as shown more clearly in Fig. 16, normally pressed outward by a spring 97ᵃ, the outward movement of said bar within its channel being limited by a transverse pin 99. The spring-actuated and normally outwardly pressed trip-bar thus formed has its upper and beveled end portion thus retained in position to successively contact with the triggers 95 when the lever 53 swings on its shaft.

Figures 5, 6:
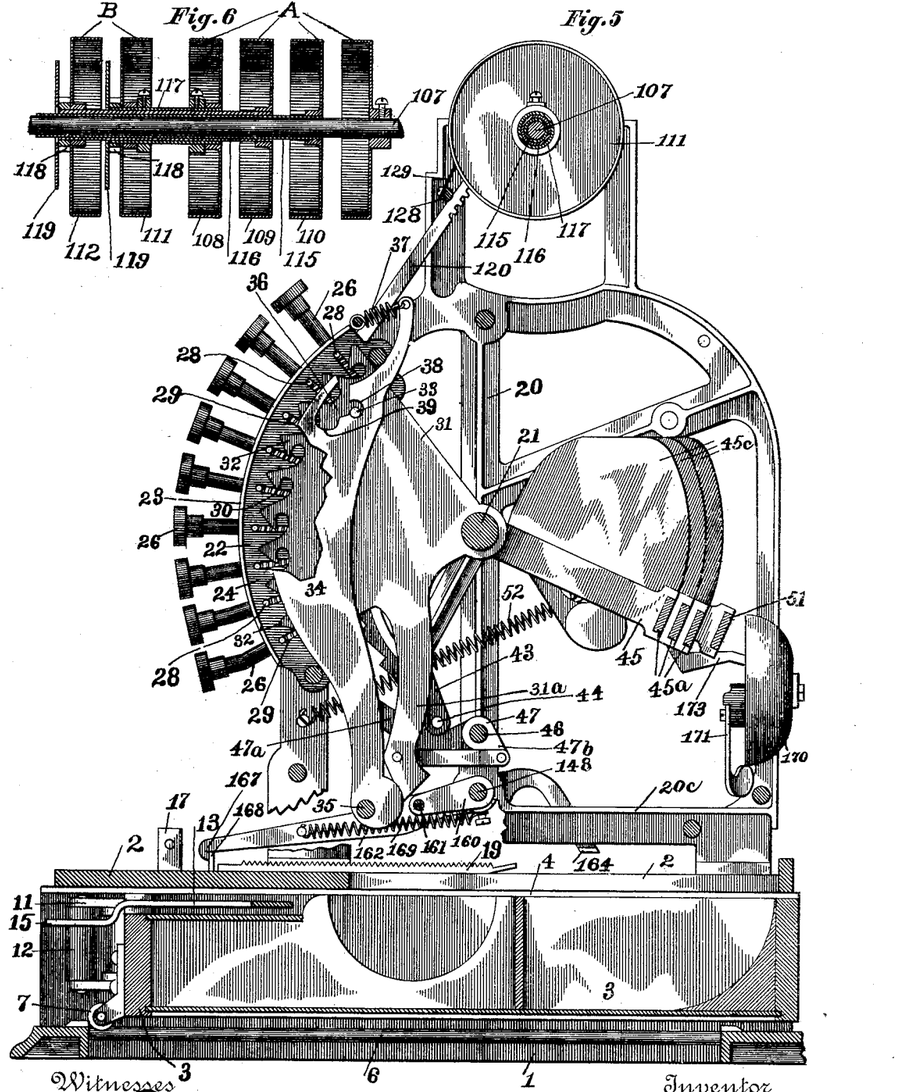
Fig. 5 is a sectional view on line $x\ x$ of Fig. 1, taken in the opposite direction from that indicated in Fig. 3.
Fig. 6 is a central vertical section of a portion of the indicator-wheels and their shafts.

Journaled in front of the transfer mechanism is a transverse shaft 101, from which depends an angle-plate 102. Connected with the shaft 101 is a curved arm 103, the lower termination of which is at a point on the outer side of the inner registering-wheel and in the path of the angular extremity of a branch arm 104, which is formed with and projects from the lever-arm 53ᵇ. Upon a transverse rod 105, which extends in front of the upper portion of the registering-wheels, are spring-actuated dogs 106, which are respectively retained in engagement with the teeth of the registering-wheels. Extending between oppositely-located upward extensions of the machine end frames is a fixed transverse rod or shaft 107, upon which are mounted, as hereinafter described, the targets or indicating-disks. In Fig. 6 of the drawings I have shown mounted on said rod one set of said indicating-disks the numbers on the peripheries of which are designed to be read from the rear of the machine, this set of indicating-wheels being indicated at A. I have also shown adjacent to set A a partial set B of indicator-disks the peripheral numbers of which are designed to be read from the front of the machine, these sets being shown complete in Fig. 1 of the drawings. Each of said sets A and B comprises as many indicator-disks or targets as there are banks or sets of value-keys, the disks of each set indicating in the present case, respectively, cents, dimes, and dollars, those of the set A being numbered, respectively, 108, 109, and 110. The indicator-disks or targets forming the set B are numbered, respectively, 111, 112, and 113. Adjacent to each of the dollar-indicating wheels 110 and 113 I affix to the shaft 107 a suitable target 114, on which is indicated the dollar-mark, as shown in Fig. 1. The target or disk 110 is carried on the outer end of a tubular shaft or sleeve 115, which loosely surrounds the rod 107. The disk 109 is similarly mounted upon one end of a second sleeve 116, which loosely surrounds the inner sleeve 115, while the disk 108 is mounted upon a third and outer sleeve 117. Of those comprising the set B the disk 111 is mounted upon the sleeve 117, the disk 112 upon the sleeve 116, and the disk 113 upon the sleeve 115. Each of the sleeves above mentioned carries a pinion-wheel 118, to which is affixed a ratchet-wheel 119. 120 represent rack-bars, one for each bank or set of keys, the toothed under surface and rear portion of each of these rack-bars gearing with one of the pinion-wheels 118, as indicated more clearly in Fig. 11 of the drawings. The bars thus formed extend downwardly and forwardly to points in front of the central shaft 21, where, as indicated more clearly in Fig. 13 of the drawings at 121, each of said bars is fulcrumed to the forward end of a lever arm or bar 122, the central portion of which is fulcrumed on said shaft 21. The rearwardly-extending portion of each of the lever-bars 122 normally contacts on its upper side with the lower end of a set-screw 123, which is adjustably supported in a lug 124, which projects laterally from the adjoining yoke-arm 45. Fulcrumed to the yoke-bar 45 in rear of the rear portion of the bar 122, as indicated in dotted lines in Fig. 11 of the drawings, is a weight-arm 125, the weight of the enlarged lower end of which results in its forward or upper beveled end portion normally contacting with the under side of a pin 126, which projects laterally from the lever arm or bar 122. As indicated at 127, I connect the rack-bars 120 with the lever-bars 122 by springs, which serve to hold the teeth of said rack-bar in engagement with the pinions 118.

128 represents a transverse rod or shaft which is journaled in the framework in front of the targets or indicating-disks, said rod having secured thereto spring-pawls 129, which respectively engage the teeth of the ratchet-wheels 119. On one of the outer projecting ends of the shaft 21 I fulcrum the central portion of a lever 130, the upper end of which is jointedly connected at 131 with a short arm 132, which depends from the spring-pawl-carrying shaft 128.

133 represents a trip-lever which in its forward portion is jointedly connected at 134 with the lower end of the lever 130. From this point of connection with the lever 130 the trip-lever extends rearwardly and upwardly, terminating in an inclined or curved tongue 135. In rear of this tongue portion I provide the upper side of the trip-lever with a notch or recess 136. The trip-lever in front of its fulcrum-point is provided with a short forward extension 137, which through the medium of a coiled spring 138 is connected with the machine-frame at a forward point.

139 represents a pin which projects inwardly from the trip-lever and is adapted to normally bear in an upper side recess or notch 140, which is formed in a lower cross-frame piece 20$^a$. (See Figs. 7 and 3.) The pin 139 is retained in contact with the upper side of the cross-piece 20$^a$ through the medium of a vertical spring 141, the lower end of which connects, as shown more clearly in Fig. 3, with the base-frame.

142 is a drawer-latch bar, the rear end of which is fulcrumed at the rear portion of the machine to an outwardly-projecting frame-pin 143. This drawer-latch has its forward portion provided with a laterally-extending arm 144, which bridges the upper side of the frame-bar 20$^a$ and trip-lever 133. This laterally-extending arm 144 is provided with a rearwardly-extending central branch arm 145, which projects over the pin 139. The body of the latch-bar 142 is provided with a forward extension 142$^a$, the downturned or hook end of which is adapted to engage a drawer-lug 146 when said drawer is in its closed position. The latch-bar is retained in position for engagement with said lug through the medium of a coiled spring 147, which connects the inner end of the arm 144 with the lower framework.

Fulcrumed on a shaft 148, which extends between the lower portions of the end frame standards, and at a point adjacent to that end of the machine which is provided with the latch-bar 142, is a trip-lever 149, the latter being provided with a comparatively short forwardly and downwardly extending arm 149$^a$ and a rearwardly-extending hook-shaped arm 149$^b$. The forward arm 149$^a$ is, through the medium of a spring 150, which tends to pull said arm outward and upward, retained in engagement with the inner end of a release key-stem 151, this key-stem being mounted to slide in an inclined bracket 152, which is supported by the machine-framework in front of said trip-lever 149. The key-stem 151 is limited in its outward movement by the contact of its laterally-projecting pin 153 with a shoulder of said bracket.

The remaining arm 149ᵇ of the trip-lever is normally retained below and in position for contact with the pin 139 when said lever-arm is forced upward in the manner hereinafter described. At the rear side of the machine and opposite the bracket 152 I provide a corresponding inclined bracket 154, in which is mounted to slide, as prescribed for the key-stem 151, a corresponding releasing-key stem 155. The inner end of the key-stem 155 contacts with the rearwardly and downwardly extending arm 156 of a bell-crank lever 157, the remaining arm 158 of which extends downward and thence inward beneath the hook-shaped termination of the lever-arm 149ᵇ. Journaled on the frame-rod 148, toward the opposite end of the machine from that in which is located the trip-lever 149, is an oblong frame 159, the parallel forwardly-projecting frame-arms 160 of which support a rod 161, which is parallel with the shaft 148. 162 represents a lifting-lever, which in rear of the center of its length is provided with a longitudinally-slotted opening 163, through which projects the outer end of the shaft 148, on which said lever is thus fulcrumed. The rearwardly-extending portion of the lever 162 is bent downward to a point below the cross frame-bar 20ᶜ, said downwardly-extending portion having, as indicated in Fig. 5, a laterally-projecting catch-lug 164, which is adapted to engage the under side of said frame-piece 20ᶜ. The forwardly-extending and longer arm of the lever 162 is provided on its upper side with successively-arranged adjoining notches 165 and 166, which are adapted to successively engage the outer projecting end of the frame-rod 161 in the manner hereinafter described. The longer arm of the lever 162 is provided with a downturned outer end or shoulder 167, which is adapted when the drawer is in the closed position to engage an upwardly-projecting catch-piece 168, which is on the drawer-top.

169 represents a spring, one end of which is connected, as indicated more clearly in Fig. 5, to the inner side and outer portion of the lever 162 and the remaining end of which is connected with the shaft 148, said spring being normally under tension.

On the rear portion of the framework adjacent to one end of the machine I have fixed an alarm-bell 170, adjacent to which I fulcrum an angular bell-tapper 171. Upon the yoke 51 is fulcrumed at 172 a spring-actuated tapper-operating finger 173, which when the yoke 51 is lowered is adapted to come into contact with the upper arm of the bell-tapper and cause an engagement of the lower end of the latter with the bell.

In order to illustrate the operation of my improved register and explain the utility of the various parts which have been described herein, we will assume that the cash-drawer is closed, that the value-keys are in their outer position, and that ciphers are shown on the front or exposed portions of the indicator-wheels. One of the value-keys being depressed—for instance, the five-cent key—the laterally-projecting pin 28 of said key-stem comes into contact with the forward curved edge of the latch-plate 34, forcing the latter back until the pin 33 is released from the offset 38 and drops into engagement with the lower portion of the recess 39. The forward and downward movement thus imparted to the corresponding lock-plate results in the engagement of one of its hook-fingers 32 with said key-stem pin 28, thus temporarily locking the key-stem in its depressed position. The movement imparted to the downward extension of the lock-plate 31 above described results, through the connection of said extension with the bar 49, in dropping the lever-arm 47ᵃ downward out of the path of the pin 44 of the corresponding segment extension 43. Having by the depression of the five-cent key determined the amount to be indicated and registered, the drawer is opened by pressing inward either one of the releasing-keys 151 or 155. Assuming that it is the key 151 which is depressed, it is obvious that the pressure exerted by the stem thereof on the lever-arm 149ᵃ (see Fig. 3) must result in an upward movement of the hook-shaped lever-arm 149ᵇ, causing the latter by contact to lift the pin 139 out of the frame-recess 140 and onto the top of said frame-piece 20ᵃ. In its upward movement the lever-arm 149ᵇ also contacts with and lifts the lateral extension 144 of the drawer-latch bar 142 until the latter is disengaged from the drawer catch-lug 146. In case, however, the rear releasing-key 155 is depressed instead of the forward key it is obvious that the upward movement of the longer arm 158 of the lever 157 will serve to raise the lever-arm 149ᵇ, with the result above described. The latch-bar being now disengaged from the drawer, the latter is free to move rearward or to the open position, this movement being started by the spring 9, but accomplished principally through the weight of the outer yoke 51, which in swinging downward causes the fulcrumed bar 13, (see Fig. 10,) with which said yoke is connected, as described, to swing on its fulcrum or pivot-pin, this swinging movement resulting, through the contact of the extension 15 of said bar and the friction-roller 12 of the drawer and the assistance of the spring 52, in forcing said drawer outward. Inasmuch as the units or cents segment was unlocked or released by the depression of the value-key and the consequent dropping of the locking-lever arm 47ᵃ, it is obvious that that yoke 45 with which said released segment is connected will be free to swing downward with its supporting-yoke 51. An upward swinging movement of said released segment is thus attained until that notch or shoulder of said segment which is designed to come into contact with the inner end of the depressed five-cent key-stem has engaged therewith. The dropping of the yoke-frame 45 results in a corresponding drop of the cent-pawl arm 63, the degree of this dropping movement being so regulated by the degree of movement of the segment as to cause the pawl 64 of said pawl-arm to drop downward over five teeth of said cents-wheel, said pawl thus being in position when raised to its normal height to move said cents or units wheel so that the figure displayed thereon at any given point will show an addition of five cents. This operation of raising the yoke 45 and registering the amount indicated by the key depressed is accomplished only by the closing of the drawer, the results of which will be further described hereinafter.

I will now proceed to describe the operation of the mechanism whereby the amounts corresponding with the value-keys depressed are shown on the peripheries of the indicator-wheels.

The slight forward movement of the trip-lever 133, which was caused by tension of the spring 138 when the pin 139 was lifted out of its frame-recess 140, resulted in a slight swinging movement of the lever-bar 130 and in a consequent partial rotation of the pawl-shaft 128, which served to move the pawls 129 out of contact with the teeth of the indicator-ratchet wheels 119. The descent of the yoke 45 and its weight-arm 125, heretofore described, resulted in a corresponding swinging movement of the adjoining lever-arm 122 (see Fig. 11) and a consequent upward movement of the rack-bar 120, the limit of movement of said yoke and consequent limited movement of the rack-bar being sufficient to rotate the cents-indicating wheel 111 until the figure "5" thereon shows in the center of said wheel from the front or key side of the machine. Owing to the fact that this wheel 111 is mounted upon the same sleeve with the wheel 108, the figure "5" on the latter wheel will be displayed from the rear or drawer side of the machine, this result being attained through the fact that the corresponding numbers on said wheels 111 and 108 are arranged at opposite points.

The descent or fall of the weighted outer yoke 51, heretofore described, is by contact with the tongue portion 135 of the spring-actuated trip-lever 133 cushioned against result of sudden stoppage, the rear bar of said yoke 51 engaging at the termination of its movement with the notch or recess 136 of said trip-lever.

My improved machine is so constructed that when the drawer is opened the outward movement of said drawer admits of the outer weighted yoke 51 swinging past the stopping-point of the descending yoke or yokes 45. As the drawer is forced to the closed position the overthrow or surplus movement of said outer weighted yoke admits of the latter moving upward a limited distance before the beginning of the upward movement of the yoke or yokes 45. In this first movement of the outer yoke 51 its rear bar is disengaged from the notch 136 of the trip-lever, and through contact of said rear bar with the tongue of said trip-lever the latter is forced sufficiently rearward to cause a reëngagement of the pin 139 with the frame-recess 140. The movement of the trip-lever last described results through the consequent movement of the lever-bar 130 in such partial rotation of the shaft 128 as to cause a reëngagement of the pawls 129 with the teeth of the indicator ratchet-wheels, thus locking said cents-wheels in positions which display amounts corresponding with the keys depressed, said indicator-wheels remaining in this locked position until the drawer is again opened. The operation of closing the drawer being continued, it is obvious that the upward movement imparted to the outer weighted yoke 51 must serve to elevate that yoke 45 which has been lowered, as heretofore described, to its normal position. In the upward movement of said yoke 45 it is obvious that the pawl-arm 63, which is supported thereby, will be raised to its normal position, and, as heretofore described, the cents or units wheel 56 will be rotated the distance of five teeth. The opening of the drawer and the consequent disengagement of the hook end of the lifting-lever 162 with the drawer-lug 168 resulted in dropping the longer arm of said lever downward until the end of the rod 161 was disengaged from the notch 165, while at the same time the tension of the spring 169 served to draw said lifting-lever to its rearward limit, thus bringing the rod end 161 over the forward notch 166. In the closing movement of the drawer it is obvious that the contact of the drawer-lug 168 with the under side of the lifting-lever must result in raising the same, and when said drawer-lug has again contacted with the hook end 167 of said lifting-lever it is obvious that the continued closing movement of said drawer must result in forcing said lifting-lever forward until the rod 161 by contact with the rear incline of the forward notch 166 has been raised to the high point between the notches. This elevation of the rod 161 has resulted by contact with the under side of the lowered lock-plate extension 31$^a$ in lifting the latter until its hook-fingers are out of engagement with the lateral pins of the depressed key-stems, and the lock-plate pin 33 is again seated in the offset 38 of the recess 39, thus allowing the depressed key to return to its normal position. The slight forward swinging movement imparted to the lock-plate extension when the same was lifted in the manner above described results in a forward movement of the connecting-bar 49 and in a consequent swinging movement of the lever 47 until its longer arm 47$^a$ is raised to the first-described normal position. The completion of the drawer-closing operation results in the rod 161 dropping over into the notch 165, in which position said rod is out of contact with the under side of the lock-plate extensions. It will thus be seen that a complete closing of the drawer must result in all of the lowered or depressed lock-plates being raised to their normal positions, in the return of the depressed keys, and in the lifting of the heretofore-dropped arms 47ª of the levers 47. During the closing movement of the drawer and the heretofore-described upward movement of the yoke 45 it is evident that the lower weighted end of the adjoining weight-arm 125 will, by the contact of said weight-arm with the pin 126 of the lever-arm 122, be swung upward, so that when the drawer is again opened and the indicator ratchet-wheels released the weight of said arm 125 will tend to throw the rack-bar 120 downward to its normal position or until the cipher-mark is displayed on the indicator-wheel in place of the amount previously registered.

I will now describe the operation of the transfer mechanism whereby amounts are transmitted in tens from one registering-wheel to another.

Assuming that the registering-wheels were originally set at zero or that the zero or nought characters were displayed on the fronts of the registering-wheels opposite a given point in the machine, it is evident that the hereinbefore-described operation of depressing the five-cent key and opening and closing the drawer must have resulted in the numeral "5" being displayed on the unit-wheel at the point previously indicated by the nought character. By assuming now that the next transaction which it is desired to register also amounts to five cents said five-cent key is again depressed and the drawer opened and closed in the manner heretofore described. The last-mentioned drawer-closing operation must result, as will readily be seen, in the units-wheel being rotated until an additional five cents is registered thereon. This additional registration and movement of the units-wheel is such as to again display a cipher at the point of observation in place of the numeral "5." In addition to this result the units-wheel has been moved sufficiently to cause an engagement of one of its peripheral contact-lugs 62 with the end of that pawl-arm 93 which is arranged above the units-wheel, the latter passing said lug and being consequently raised thereby. The elevation thus imparted to the forward end of the pawl-arm 93 results through the downward pressure of the rear portion of said arm against the pin 92 (see Fig. 14) in raising the hook end or head of the adjacent catch-lever 89 out of engagement with the head of the pawl 84, allowing the lowered tooth or arm of the latter to drop by tension of its spring into engagement with a tooth of the tens-wheel 57. When the drawer is again opened, it is obvious that the rearward swinging movement which is imparted to the spring-pressed trip-bar 97 will cause the upper end of the latter to successively engage the depending triggers 95 of the shafts 74 to 77. It is evident that the contact above described of the trip-bar and depending triggers must impart a partial rotation to the shafts from which said triggers depend, these shafts being, however, immediately returned to their normal positions through the medium of the springs 100. In the present instance the partial rotation which is imparted to the first of these shafts 74 and the consequent slight forward movement of the lever-arm 79ª is sufficient to cause the tens-wheel 57 to be moved the distance of one tooth or number through the engagement of the pawl-arm 85 therewith. In this manner the point of observation on the forward side of the units-wheel is made to display a cipher or nought character, while the adjoining and opposite point on the tens-wheel will display the numeral "1," thus indicating that ten cents has been registered. As the end of the trip-bar 97 moves out of contact with the last of the triggers 95 the lever branch arm 104 comes into contact with the lower end of the curved arm 103, and through the elevation thus imparted to said arm and the consequent lifting contact of the angle-plate 102 with the upper arm 86 of the released pawl 84 said pawl is again raised to its normal position and engaged with the head of the catch-lever 89. Owing to the bevel of the upper end portion of the trip-bar 97 and the corresponding inner faces of the triggers 95, it is obvious that the contact of said bar with said triggers, which occurs during the closing of the drawer, will only result in forcing said trip-bar inward and admitting of its freely passing said triggers. Although I have only described the operation of transferring from the units to the tens registering-wheels, it is obvious that the same description must apply to the operation of transferring amounts from any one of said registering-wheels to the other. Owing to the fact that the raising of the outer yoke 51 causes a contact therewith and an outward pressure of the rod 70 and a consequent dropping of the lock-tongue 67 in rear of the pawls 64, it is obvious that any overthrow or surplus movement of the registering-wheels will be prevented.

Upon the pawl-carrying shaft 105 I support a rearwardly-projecting pawl-bar 105ª, between the beveled edge portion of which and the teeth of the registering-wheels are adapted to wedge the ends of the dropped pawl-arms 85, thus preventing any tendency of said registering-wheels toward excessive movement or overthrow.

From the construction and operation of the machine herein described it will be observed that simple, reliable, and effective means are not only provided for opening the drawer toward the rear of the machine, but that the operation of releasing said drawer may be accomplished from either the front or rear of the machine. It will also be observed that in addition to other improvements superior means are provided for displaying the amounts registered on the indicator-wheels from either the front or rear of the machine.

Having now fully described my invention, what I claim, and desire to secure by Letters Patent, is—

1. In a cash-register, the combination with the framework, a rearwardly-sliding drawer therein, and means for latching said drawer in a closed position, of a drawer-opening lever fulcrumed on the frame above the drawer and having one of its ends in contact with said drawer, a weighted arm 54 movably supported from the machine above said drawer, a link connecting said arm 54 and said lever-bar whereby the weight of the arm throws the drawer open when released and means for releasing said drawer, substantially as specified.

2. In a cash-register, the combination with the framework, a sliding drawer therein, a friction-roller journaled from said drawer, and means for latching the latter in a closed position, of a fulcrumed drawer-opening lever 13 having one of its ends in contact with said roller, a weighted arm 54 movably supported from the machine above said drawer, a jointed connection between said arm 54 and said lever-bar 13 whereby the weight of the arm throws the drawer open when released and means for releasing said drawer, substantially as specified.

3. In a cash-register, the combination with a frame, one or more registering-wheels journaled in said frame, a set of value-keys projecting from the front of said machine and mechanism between said value-keys and registering-wheels whereby the latter will register an amount corresponding with the value-keys depressed, of a sliding drawer and a latch therefor, an arm having a swinging support in said machine, a drawer-opening lever fulcrumed near its center to the frame above the drawer, and engaging therewith and connections between said arm and lever whereby the downward movement of the arm forces the drawer rearward when the same is released, substantially as specified.

4. In a cash-register, the combination with the framework, a sliding drawer therein and a fulcrumed latch-bar adapted to retain said drawer in a closed position, of a lever 149 journaled in the framework, said lever having forwardly and rearwardly extending arms and releasing-keys arranged respectively at the front and back of said machine and means whereby the depression of either of said keys results in a lifting contact of one arm of said lever 149 with said drawer latch-bar, substantially as specified.

5. In a cash-register, the combination with the framework, a sliding cash-drawer therein and a fulcrumed latch-bar adapted to engage said drawer to retain it in a closed position, of a two-arm lever 149 journaled in said framework, a pivoted lever 157, releasing-keys 151 and 155 arranged respectively at the front and back of the machine, one of said keys adapted to contact with one arm of the lever 149 and the remaining key adapted to contact with one arm of the lever 157, the remaining arm of the latter being beneath an arm of the lever 149 and means whereby the swinging of the lever 149 causes a lifting contact of one of its arms with said latch-bar, substantially as specified.

6. In a cash-register, the combination with the framework, a set of value-keys, a sliding cash-drawer, a registering mechanism and a fulcrumed lock-plate adapted to swing downward and retain one of said keys in a depressed position, of a lifting-frame 159 fulcrumed beneath and adapted to exert a lifting action on said lock-plate, a lifting-lever 162 fulcrumed to said framework, said lever being adapted to swing downward when the drawer is opened and to be forced upward by contact with said drawer when the latter is closed, said fulcrumed lifting-frame having its outer arm supported by said lever, subtantially as specified.

7. In a cash-register, the combination with the framework, a registering mechanism, a set of value-keys adapted to be independently depressed, a sliding cash-drawer, and a fulcrumed lock-plate adapted to swing downward and temporarily lock a depressed key, of a lifting-frame journaled beneath said lock-plate, and a lifting-lever mounted to slide on the machine-frame and adapted to engage said drawer when it is closed and be moved longitudinally by the closing movement of said drawer, said lifting-lever engaging said lifting-frame, substantially as specified.

8. In a cash-register, the combination with the framework, a set of value-keys, a sliding cash-drawer, a catch-piece on said drawer, a registering mechanism and a fulcrumed lock-plate adapted to swing downward and retain one of said keys in a depressed position, of a lifting-frame 159 fulcrumed beneath and adapted to exert a lifting action on said lock-plate, a lifting-lever having a fulcrumed and sliding connection with the framework, said lever adapted to engage a catch-piece on said drawer when the latter is closed and adapted by contact with said drawer to be lifted during the closing action, notches 166 and 165 in said lifting-lever, one of which is adapted to receive an extension of said lifting-frame when the drawer is open and one of which is adapted to receive said lifting-frame extension when the drawer is closed, substantially as specified.

9. In a cash-register, the combination with the framework, a sliding drawer, a set of value-keys, a registering mechanism and a swinging frame-piece 45, the degree of movement of which is dependent on the value-key depressed, of a journaled indicator-wheel carrying a pinion, a rack-bar engaging said pinion, a fulcrumed lever-bar 122 having a jointed connection with said rack-bar, a weight-arm 125 swinging from said frame-piece 45 and having its upper portion engaging a projection of said lever-arm 122 and means whereby the depression of a value-key and the opening of the cash-drawer produces a downward swinging movement of said frame-piece 45 and whereby the closing of said drawer produces an upward movement thereof, substantially as specified.

10. In a cash-register, the combination with a frame, one or more registering-wheels journaled in said frame, a set of value-keys projecting from the front of said machine and mechanism between said value-keys and registering-wheels whereby the latter will register an amount corresponding with the value-keys depressed, of a sliding drawer and latch therefor, a swinging lever through which the movement of the drawer is communicated to the adding and indicating mechanism, and releasing-keys arranged respectively at the front and back of the machine so that either may be operated at will, substantially as specified.

HENRY S. HALLWOOD.

In presence of—
H. B. BRADSHAW,
EVERETT VARIAN.